(12) United States Patent
Monga et al.

(10) Patent No.: US 8,477,374 B2
(45) Date of Patent: Jul. 2, 2013

(54) COST-EFFECTIVE BINARY PRINTER MODELS FOR MULTI-COLOR PRINTERS BY IMPROVED REFLECTANCE MODELING AND PATCH CLUSTERING

(75) Inventors: Vishal Monga, Webster, NY (US);
Shen-Ge Wang, Fairport, NY (US);
Raja Bala, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 447 days.

(21) Appl. No.: 12/894,475

(22) Filed: Sep. 30, 2010

(65) Prior Publication Data
US 2012/0081755 A1 Apr. 5, 2012

(51) Int. Cl.
*H04N 1/60* (2006.01)

(52) U.S. Cl.
USPC .......... 358/1.9; 358/3.03; 358/3.06; 358/504; 358/518; 358/523

(58) Field of Classification Search
USPC .................... 358/1.9, 3.03–3.24, 518–525
See application file for complete search history.

(56) References Cited

U.S. PATENT DOCUMENTS

| | | | | |
|---|---|---|---|---|
| 5,469,267 | A * | 11/1995 | Wang | 358/3.21 |
| 5,649,073 | A * | 7/1997 | Knox et al. | 358/1.9 |
| 5,748,330 | A * | 5/1998 | Wang et al. | 358/3.21 |
| 5,854,882 | A | 12/1998 | Wang | |
| 5,877,787 | A * | 3/1999 | Edge | 347/19 |
| 6,266,157 | B1 | 7/2001 | Fan et al. | |
| 6,435,654 | B1 | 8/2002 | Wang et al. | |
| 7,239,820 | B2 * | 7/2007 | Donaldson | 399/49 |
| 7,724,406 | B2 | 5/2010 | Wang et al. | |
| 8,274,706 | B2 * | 9/2012 | Monga et al. | 358/504 |
| 8,300,289 | B2 * | 10/2012 | Ming et al. | 358/523 |
| 2006/0077488 | A1 * | 4/2006 | Zhang et al. | 358/504 |
| 2009/0086290 | A1 * | 4/2009 | Ming et al. | 358/501 |

FOREIGN PATENT DOCUMENTS

JP 2004072220 A * 3/2004

OTHER PUBLICATIONS

Japanese Patent Office machine translation of JP2004-072220A.*
R. Bala, "Device Characterization," Digital Color Imaging Handbook, Chapter 5, CRC Press 2003, pp. 269-384.
S. Wang et al. "Two-by-two centering printer model," Proc. Fourth Int. Conf. on Imaging Science and Hardcopy (ISISH'01), 2001, 1-4.
T. F. Gonzalez, "Clustering to minimize the maximum intercluster distance," Theoretical Computer Science, 38:293-306, (1985).
J.A. C. Yule, et al. "The penetration of light into paper and its effect on halftone reproduction," Proc. TAGA, pp. 65-76, 1951.
S. Wang et al., "Digital color halftones," Digital Color Imaging Handbook, Chapter 6. CRC Press, 2003. pp. 470-484.

* cited by examiner

*Primary Examiner* — Richard Zhu
(74) *Attorney, Agent, or Firm* — Fay Sharpe LLP

(57) ABSTRACT

Systems and methods are described that facilitate reducing a number of patches used in characterizing a color halftone printer via a binary color printer model. A binary printer model involves printing of a fundamental set of color binary patterns that encompass all possible halftone outputs. A k-center clustering technique is employed to automatically find and eliminate redundancies in the initial set of binary color patterns. Once the number of patches is reduced to an acceptable number, a multiplicative reflectance model is applied that better approximates the physical process and therefore improves accuracy.

20 Claims, 5 Drawing Sheets
(3 of 5 Drawing Sheet(s) Filed in Color)

COST-EFFECTIVE BINARY PRINTER MODELS FOR MULTI-COLOR PRINTERS BY IMPROVED REFLECTANCE MODELING AND PATCH CLUSTERING

BACKGROUND

The subject application relates to printer color characterization systems and methods. While the systems and methods described herein relate to printer color characterization in computing systems and the like, it will be appreciated that the described techniques may find application in other color characterization systems or methods, printer calibration applications, and/or other printer color assessment and/or adjustment methods.

Color device characterization is a crucial task in color management. The characterization process essentially establishes a relationship between device dependent (e.g. printer CMYK) values, and device independent (e.g. CIELAB) values. Several color management tasks such as derivation of International color consortium (ICC) profiles, color transforms for calibration etc. benefit from an accurate mathematical characterization of the physical device. For color printers, characterization is an expensive process involving large number of patch measurements. Further, this process is halftone dependent (e.g., patch printing), where measuring and associated computation is scaled proportionally to the number of halftoning methods. Recent research has proposed methods for improving the accuracy of binary color printer models so that patch printing and measuring does not have to be repeated across halftones. For instance, a 4-color 2×2 printer model requires printing and measuring 16,576 binary color patches. However, such a large number of patches is tedious and computationally expensive.

Color printer characterization is the process of deriving a mathematical transform which relates printer CMY(K) to its corresponding device independent representation, e.g. spectral, CIELAB etc. The forward characterization transform defines the response of the device to a known input, thus describing the color characteristics of the device. The inverse characterization transform compensates for these characteristics and determines the input to the device that is required to obtain a desired response. For printers therefore, a CMY(K)→CIELAB mapping represents a forward characterization transform while the CIELAB→CMY(K) map is an inverse transform.

Full color characterization can be performed as needed to correct for temporal color drift or media color drift, as described, e.g., in R. Bala, "Device Characterization," Digital Color Imaging Handbook, Chapter 5, CRC Press, 2003. This is a time consuming operation that is preferably avoided in most xerographic printing environments. Simpler color correction methods based on 1-dimensional (1-D) tone response curve (TRC) calibration for each of the individual color channels are usually sufficient and are easier to implement. The 1-D TRC calibration approach is also well-suited for use of in-line color measurement sensors, but is typically halftone dependent. In general, for each color channel C and for each halftone method H, a series of test patches are printed in response to N different digital input levels which requires C×H×N test patches, because the test patches must be printed for each halftone method. It has been found in practice that N must not be too small (e.g., N=16 is usually too small) because the TRC for each halftone method is typically not a smooth curve, due to dot overlapping and other microscopic geometries of the printer physical output. Existing methods for 1-D calibration, being halftone dependent, are measurement-intensive, and are not practical for in-line calibration, especially in print engines equipped with multiple halftone screens.

Previously, Wang and others have proposed a halftone independent printer model for calibrating black-and-white and color printers. This halftone independent printer model is referred to as the two-by-two (2×2) printer model and is described, e.g., in the following U.S. Patents, all of which are hereby expressly incorporated by reference into this specification: U.S. Pat. No. 5,469,267, U.S. Pat. No. 5,748,330, U.S. Pat. No. 5,854,882, U.S. Pat. No. 6,266,157 and U.S. Pat. No. 6,435,654. The 2×2 printer model is also described in the following document that is also hereby expressly incorporated by reference into this specification: S. Wang, "Two-by-Two Centering Printer Model with Yule-Nielsen Equation," Proc. IS&T NIP14, 1998.

One technique to build a printer characterization transform involves printing and measuring a large set of color samples, i.e. CMY(K) patches, in conjunction with mathematical fitting and interpolation to derive CMY(K)→Lab mappings. The accuracy of the characterization transform depends on the number (N) of patches printed and measured. Crucially, note that these patches correspond to contone CMY digital values, i.e. their binary representation is halftone dependent. Hence, deriving characterization transforms for a printer equipped with M halftone screens, requires N*M patches. Even for modest choices of N, M, e.g. N=1000, M=4, this number quickly grows to be unmanageable. Note that N cannot be made very small without compromising accuracy under these conventional techniques. As multiple media are thrown into the mix, the number scales further with the number of distinct media employed, i.e. N×M×P patches are needed where P distinct media types are used.

A classical 2×2 printer model exhibits several features, including a that it is a halftone printer model at the pixel level. Different from most other printer models, which only estimate the average color appearance of an area with many pixels, the 2×2 printer model provides the color appearance of every output pixel. The output pixels are defined differently from the input pixels by a shifted coordinate, although the output pixels maintain the same size and the same shape of the inputs. The color appearance of each output pixel depends on the binary values of four input pixels located at four corners of the output. The 2×2 printer model is a measurement-based printer model. All N colors defined by the 2×2 printer model can be represented by N unique calibration halftone patches and can be printed and measured independently. The total number of independent 2×2 colors depends on the number of colorants. For a monochromatic printer, N=7; for a CMY, three-colorant printer, N=1072; and a CMYK, four-colorant printer, N=16,576.

One conventional approach to reducing color patches involves patch reduction via colorant decomposition. To reduce the number of patches in calibrating a three- or four-colorant printer, the full set of the 2×2 colors, specified by the total number N, may be derived by a rendering method from a selected subset of 2×2 colors. As described in Wang et al., a total of 488 2×2 patches, most in one and two colorants, representing the selected subset were printed by a CMYK four-colorant printer and measured in spectral reflectance. The complete set of independent 2×2 colors, 16,576 in total for the CMYK printer, was derived by a method described in the reference. Although patch reduction was achieved, the color accuracy of the derived full set of the 2×2 colors was inadequate.

Accordingly, there is an unmet need for systems and/or methods that reduce the number of binary patches required to achieving a desired model accuracy, while overcoming the aforementioned deficiencies.

BRIEF DESCRIPTION

In accordance with various aspects described herein, systems and methods are described that facilitate halftone-independent color characterization for color printers. For example, a method of halftone-independent characterization of color printers comprises initially printing and measuring a complete color patch set comprising all possible (N) binary 2×2 patterns printable by a P-colorant printer, where N, P are both integers, in order to produce an initial set of measurements in a perceptual color space. The method further comprises initially performing a multidimensional clustering that partitions the complete patch set into K clusters, where K is an integer less than N, and produces a reduced set of K color patches, wherein each patch is a representative member of a cluster, and decomposing each of the said K color patches as overlaps of L basis binary 2×2 patterns where L is less than K, wherein each of the basis binary 2×2 patterns contain fewer colorants than the color binary patterns in the complete patch set. Additionally, the method comprises printing and measuring, at run time, the said L binary 2×2 color patterns within the reduced patch set, and predicting K color measurements in the reduced patch set using the color measurements of the said L basis binary 2×2 color patterns to predict and a multiplicative reflectance model. Furthermore, the method comprises predicting the color measurements of the complete set of N binary 2×2 patterns using said predicted K color measurements of the reduced patch set and cluster membership information, and deriving a P-colorant 2×2 binary printer model using said predicted measurements.

According to another feature described herein, a system that facilitates halftone-independent characterization of color printers comprises a printer that initially prints and measures a complete color patch set comprising a complete set of N possible binary 2×2 patterns printable by a P-colorant printer, where N, P are integers, in order to produce an initial set of measurements in a perceptual color space. The system further comprises a processor that executes computer-executable instructions stored to a memory, including instructions for initially performing a multidimensional clustering that partitions the complete patch set into K clusters, where K is an integer smaller than N and produces a reduces set of K color patches, wherein each patch is a representative member of a cluster. The instructions additionally comprise printing and measuring, at run time, the L basis 2×2 binary color patterns within the reduced patch set, where L is an integer less than K, and predicting K color measurements in the reduced patch set using the color measurements of the L basis binary 2×2 color patterns and a multiplicative reflectance model. Furthermore, the instructions comprise predicting N color measurements of the complete set of N binary 2×2 patterns using the predicted K color measurements of the reduced patch set and cluster membership information, and deriving a P-colorant 2×2 binary printer model from the N predicted color measurements.

Yet another feature relates to an apparatus for performing halftone-independent characterization of color printers, comprising means for initially printing and measuring a complete color patch set comprising all possible (N) binary 2×2 patterns printable by a P-colorant printer, where N, P are both integers, in order to produce an initial set of measurements in a perceptual color space. The apparatus further comprises means for initially performing a multidimensional clustering that partitions the complete patch set into K clusters, where K is an integer significantly smaller than N, and produces a reduced set of K color patches, wherein each patch is a representative member of a cluster. Additionally, the apparatus comprises means for decomposing each of the said K color patches as overlaps of L basis binary 2×2 patterns where L is less than K, and wherein each of the basis binary 2×2 patterns contain fewer colorants than the color binary patterns in the complete patch set, and means for printing and measuring, at run time, the said L binary 2×2 color patterns within the reduced patch set. Furthermore, the apparatus comprises means for predicting the K color measurements in the reduced patch set using the color measurements of the said L basis binary 2×2 color patterns to predict and a multiplicative reflectance model, means for predicting the color measurements of the complete set of N binary 2×2 patterns using said predicted K color measurements of the reduced patch set and cluster membership information, and means for deriving a P-colorant 2×2 binary printer model using said predicted measurements.

BRIEF DESCRIPTION OF THE DRAWINGS

The file of this patent contains at least one drawing executed in color. Copies of this patent with color drawing(s) will be provided by the U.S. Patent and Trademark Office upon request and payment of necessary fee.

FIG. 6 illustrates a flow diagram of a method for performing color characterization in a printer for printer calibration or the like.

DETAILED DESCRIPTION

In accordance with various features described herein, systems and methods are described that overcome the above-described problems by reducing a number of patches used in characterizing a color halftone printer via a binary color printer model. A binary printer model involves printing of a fundamental set of color binary patterns that encompass all possible halftone outputs. While the availability of such a set of patches and a corresponding color prediction equation is a great asset, for multiple colorants (e.g., 4 or more for example) the number of fundamental binary patterns grows combinatorially. As an example, a 2×2 color printer-model such as is described in the Wang patents for a CMYK printer involves printing and measuring 16,576 patches. Past research, such as is described in S. Wang et al. ("Two-by-two centering printer model", *Proc. Fourth Int. Conf. on Imaging Science and Hardcopy (ISISH'01)*, 2001, 1-4), which is hereby incorporated by reference in its entirety, has attempted to address this problem by decomposing 4-colorant 2×2 patterns as overlaps of 2×2 patterns with two or fewer colorants and synthesizing an additive reflectance prediction. To augment known patch reduction techniques such as are described by S. Wang et al., two approaches are described herein that facilitate reducing a number of patches used while actually enhancing color prediction accuracy over known techniques.

First, a k-center clustering technique is employed to automatically find and eliminate redundancies in the binary color patterns. Once the number of patches is reduced to an acceptable number, a multiplicative reflectance model is applied that better approximates the physical process and therefore improves accuracy. The described systems and methods have the advantage of being tunable in the number of required patches and can be realized with as few as 424 patches, while the most cost intensive realization uses no more than 1332 patches.

Error evaluations against the CMYK→Lab printer model built using the full patch set (16,576) confirm the effectiveness of the proposals and in particular the improvements over prior art in [3]. The described systems and methods are operable for use with the fundamental 2×2 patterns used in characterizing the printer. In the following description, the "characterization color transform" is used to refer to the forward transform; suitable inversion methods, such as are described in R. Bala, "Device Characterization", *Digital Color Imaging Handbook*, Chapter 5. CRC Press, 2003 (which is hereby incorporated by reference in its entirety), can be used to derive the corresponding inverse transform. The characterization transform is of immense value in many color management tasks such as derivation of ICC profiles for the printer, printer calibration, color control etc.

Figure 1:
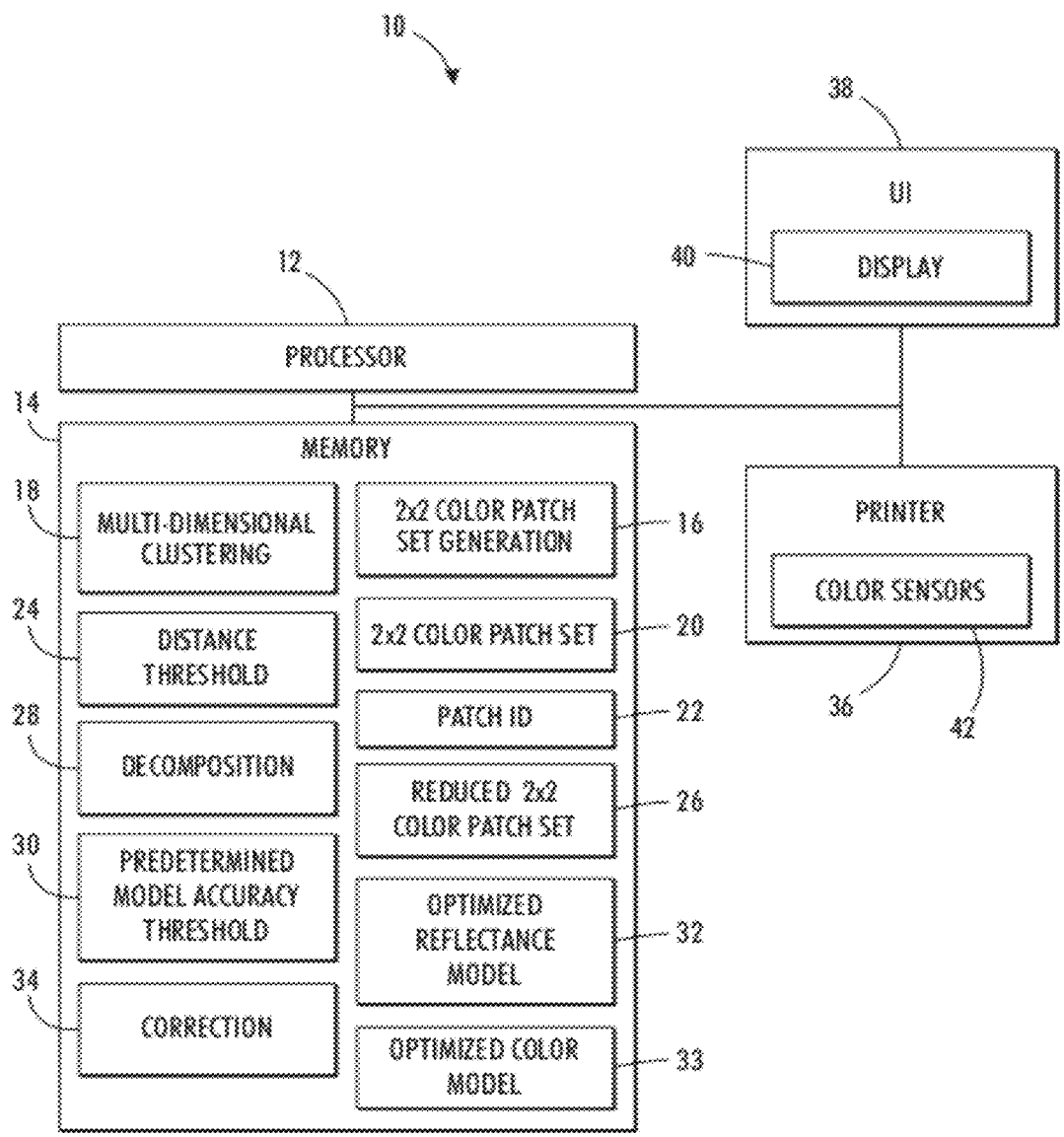
FIG. 1 illustrates a color characterization system 10 that facilitates improving the accuracy of binary color printer models as well as providing a tunable cost-quality trade-off.

With reference to FIG. 1, a color characterization system 10 is illustrated that facilitates improving the accuracy of binary color printer models as well as providing a tunable cost-quality trade-off. The system exploits inherent redundancy in 4- (or more) color 2×2 patterns via clustering in CIELAB space, and provides a multiplicative prediction model for reflectance that more accurately models the underlying physics than the additive synthesis of reflectance used in known techniques.

Accordingly, the system 10 includes a processor 12 that executes, and a memory or computer-readable medium 14 that stores, computer-executable instructions for performing the various functions, actions, techniques, algorithms, etc., described herein. The memory stores a 2×2 color patch generation algorithm or module 16 that generates and measures a completes set of N 2×2 color patches, and a multidimensional clustering algorithm or module 18 that reduces an initial number of 4-color 2×2 patches used for color characterization. In one example, the multidimensional clustering algorithm is a k-center clustering algorithm. For instance, the color model generation module 16 creates 16576 2×2 color patches when generating a 4-color patch set 20. The multidimensional clustering module 18 is then executed by the processor 12 to generate K clusters of patches according to their respective ΔE values (where K is an integer less than N). It will be appreciated that although the systems and methods described herein refer to 4-color models, that other sizes of models (e.g., 5-color, 6-color, . . . , M-color, where M is an integer) are contemplated and intended to fall within the scope and spirit of the aspects described herein.

In printer color management, several different CMYK combinations (and hence their binary equivalents) can lead to the same (averaged) CIELAB color for a fixed illuminant. This is because there is inherently some spectral redundancy in the C, M, Y and K colorants. While the 2×2 printer patch set provides a set of binary "basis patterns" that span all possible binary color patterns, the redundancy is not exploited and provides scope for further reduction of color patches to print.

In one example, the system applies k-center clustering in 3-D CIELAB space to reduce the number of color patches used to achieve a desired level of model accuracy. For instance, if N=16576, 4-color 2×2 patterns are printed, K clusters are obtained using k-center clustering, such as is described in "Clustering to Minimize the Maximum Intercluster Distance" (T. F. Gonzalez. Theoretical Computer Science, 38: 293-306, 1985), which is hereby incorporated by reference in its entirety. In particular, the system executes a computational procedure (e.g., a patch identification algorithm 22) to identify 4-color 2×2 patterns such that their CIELAB values are either the same or very close for all practical purposes.

K-center clustering varies from k-means clustering in that k-means minimizes an expected squared distance based error function to cluster "similar" objects, whereas k-center aims to minimize the maximum distance between members in a cluster. More formally, for a set A of N multidimensional vectors $x_i$, i=1, 2, . . . N, the goal of a typical clustering is to obtain a partition S of A into K clusters where K<N. The difference in criterion between k-means vs. k-center is expressed as follows:

K-means:

$$\min_S \sum_{k=1}^{K} \sum_{i: x_i \in C_k} \|x_i - \mu_k\|^2 \qquad (1)$$

where $\mu_k$ is the centroid for cluster $C_k$. That is, $\mu_k$ is the average of all $x_i$'s in cluster $C_k$.

K-center:

$$\min_S \max_{k=1 \ldots K} \max_{i: x_i \in C_k} \|x_i - \mu_k\|^2 \qquad (2)$$

where $\mu_k$ lies within the cluster and is seen to be the cluster center but NOT necessarily a centroid.

Figure 2:
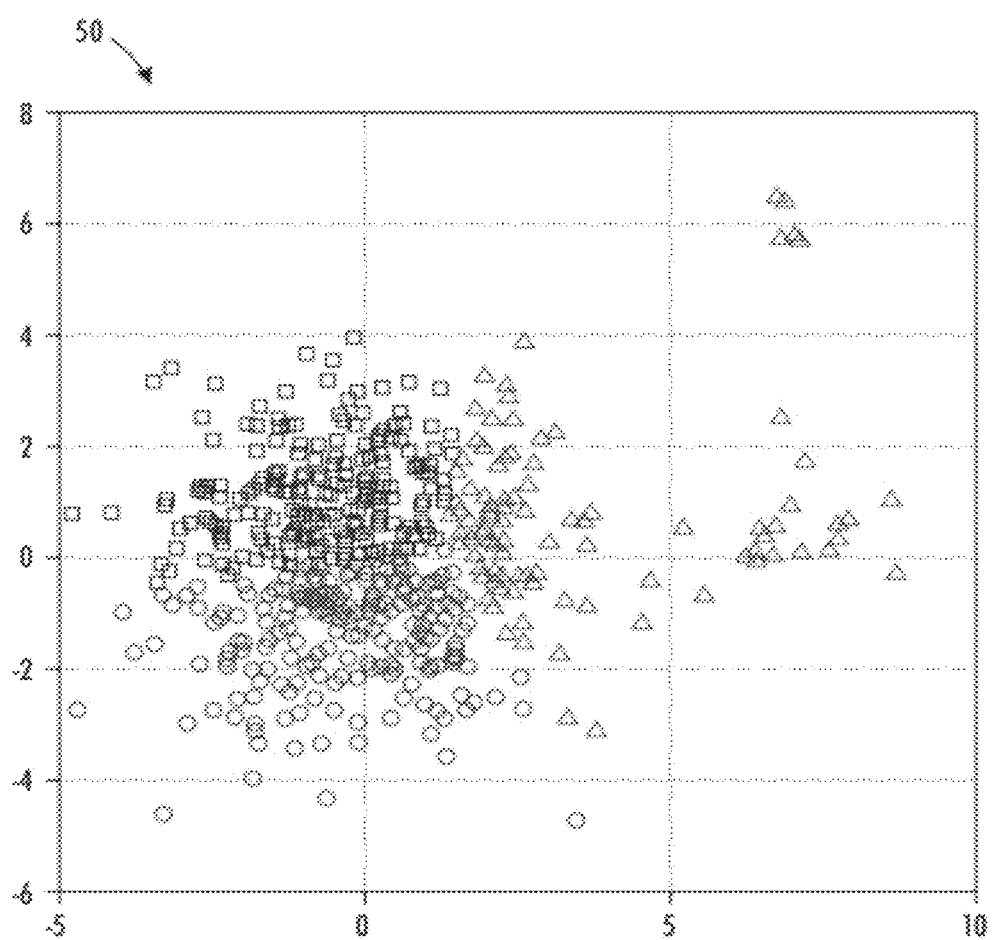
FIG. 2 illustrates a k-means clustering.
Figure 3:
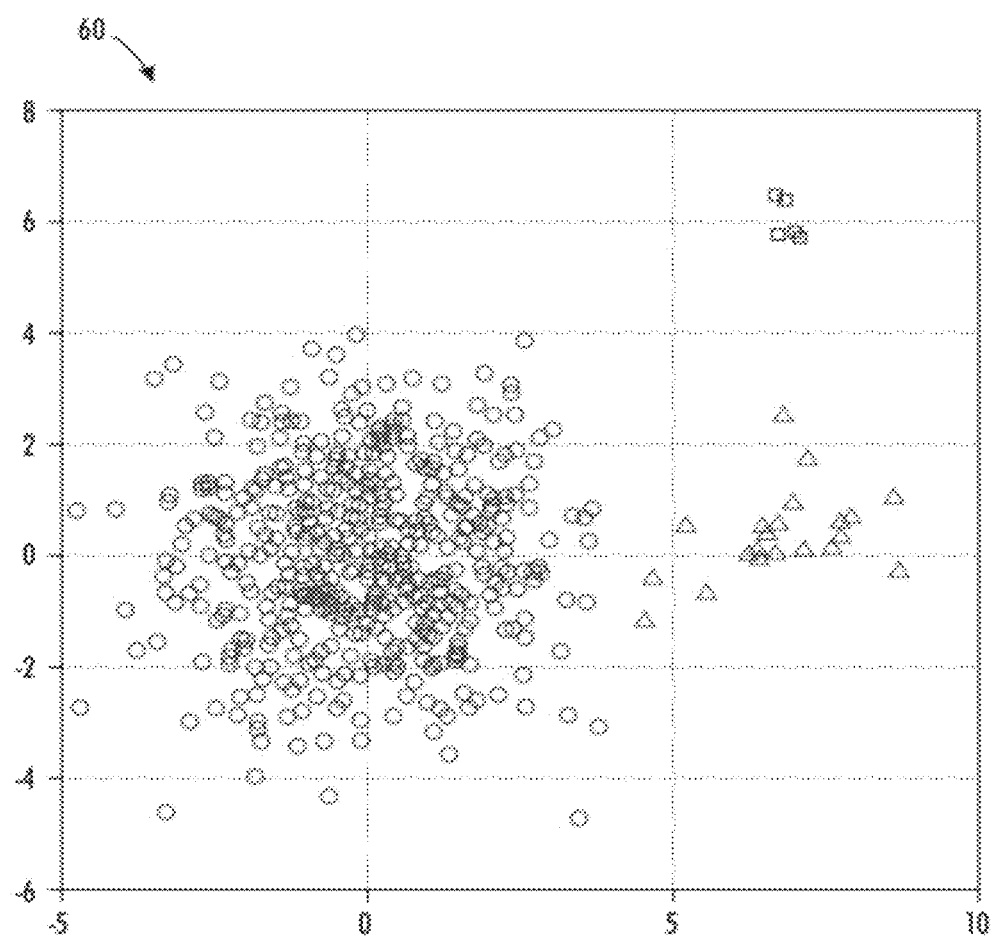
FIG. 3 illustrates a k-center clustering.

With continued reference to FIG. 1, FIGS. 2 and 3 illustrate the difference between k-center and k-means clustering. Succinctly put, k-means considers the average while k-center considers the worst-case scenario. FIG. 2 thus shows a k-means clustering 50. FIG. 3 illustrates a k-center clustering 60. In k-center clustering, it is possible to associate a cluster spread $D_k$ with each cluster $C_k$, such that no members are more than distance $D_k$ apart, or put another way, all members are within distance $D_k/2$ of some point called the cluster center Referring back to FIG. 1, the system 10 further includes the patch identification algorithm or module 22 that reduces the initial number of patches in the model 20 to only K identified patches of interest (where K is less than N) by comparing each patch's distance value $D_k$ to a predetermined distance threshold value 24. If $D_k$<the threshold distance value, then the patch is identified as a patch of interest. A reduced 2×2 color patch set 26 is then generated by the processor 12 and includes only the patches of interest.

Once the 4-color 2×2 patches of interest are identified, a second stage of patch reduction is performed. To this end, the system 10 includes a decomposition algorithm or module 28 that decomposes the K 4-colorant 2×2 patterns into overlapping patterns of a lesser number (L) of colorants. Decomposition is performed to achieve a predetermined model accuracy threshold level 30 (e.g., 95% accuracy, 99% accuracy, 100% accuracy, etc.) while still using fewer patches than conventional models. In order to decompose a reduced data set comprised by the reduced color patch set 26, the decomposition module 28 applies a multiplicative reflectance model 32 to patches in the reduced data set. Once decomposed, the remaining patches are included in an optimized P-colorant 2×2 color model 33 comprising L patches, where L is an integer less than K, which is stored in the memory 14. A correction or calibration algorithm or module 34 is optionally executed by the processor to calibrate a printer 36 using the optimized color model 33. Additionally, the system may comprise a user interface 38 with a display 40 on which color model information is presented to a user. Furthermore, the printer 36 includes one or more color sensors 42 that are employed to detect color inaccuracy, calibration success, etc. The color sensors 42 are also employed for initial (e.g., "offline") color measurement. Additionally, although depicted as separate components, the processor 12 and memory 14 may be integral to the printer 36.

As is generally known, a 4-color pattern can be decomposed as overlaps of M two-color 2×2 binary patterns, where M is an integer. That is, the reflectance $R(\lambda)$ of the 4-color 2×2 patterns is given by:

$$R(\lambda) = \sum_{i=1}^{M} a_i R_i(\lambda), \, i = 1, 2, 3, \ldots M \quad (3)$$

where $R_i(\lambda)$'s individually represent reflectance of constituent two-color 2×2 patterns and where contributions ($a_i$'s) of the constituent 2×2 color patterns are estimated via an optimization.

However, the decomposition algorithms and techniques employed by the system 10 recognize the limitations of this kind of reflectance synthesis, and provide an alternate formulation that more closely describes the underlying physics. A shortcoming of classical approaches that use Eqn. (3) is that the quality of the approximation to the true (measured) reflectance for the 4-color pattern varies significantly depending on how the 2×2 pattern is decomposed, e.g. a 4-color 2×2 pattern may be decomposed non-uniquely both in considering colorant overlaps (e.g., 1 vs. 2 vs. 3 color), and the combinations of colorants therein (e.g. CM+MY+YK or CM+YK or CY+MY+MK, etc.) In the classical techniques, these options are listed as varying approaches and a way to counter this has been suggested by considering an average of the reflectance estimates from each of these approaches. This, however, defeats the purpose of patch reduction because now the number of required patches to print increases significantly as each approach requires different patch printing and measuring.

Therefore, the decomposition algorithms 28 perform and/or comprise multiplicative synthesis of reflectance (additive in log-space) that does not suffer from the aforementioned limitation. In particular, for any decomposition of a 4-color 2×2 pattern into L constituent components, such that:

$$R(\lambda) = \prod_{i=1}^{L} (R_i(\lambda))^{a_i} \quad (4)$$

The decomposition algorithm or module 28 decomposes 4-color 2×2 patterns into 3-color and 2-color 2×2 basis patterns. Tables 1 and 2 show the breakdown of 4-color 2×2 patterns.

TABLE 1

| Type of 2 × 2 colors | CMY printers | CMYK printers |
|---|---|---|
| White | 1 | 1 |
| One colorant | 18 | 24 |
| Two colorant | 189 (63 × 3) | 378 (63 × 6) |
| Additional with primaries | 16 | 65 |
| Total used for characterization | 224 | 468 |
| Total number of 2 × 2 colors | 1,072 | 16,576 |

TABLE 2

| TYPE | SHAPE DESCRIPTION | COUNT |
|---|---|---|
| White paper | 0000 | 1 |
| Single-colorant pattern | C M Y K | 6 × 4 |
| Dual-colorant pattern | C ⊕ M  C ⊕ Y  C ⊕ K | |
| | M ⊕ Y  M ⊕ K  Y ⊕ K | 63 × 6 |
| Triple-colorant pattern | C ⊕ M ⊕ Y  C ⊕ M ⊕ K | |
| | C ⊕ Y ⊕ K  M ⊕ Y ⊕ K | 864 × 4 |
| Quadrille-colorant pattern | C ⊕ M ⊕ Y ⊕ K | 12717 |
| TOTAL number of patterns in the complete set | | 16576 |

If no more than two-color 2×2 basis patterns are considered as canonical, then a total of 468 patches are needed to decompose all of the 16576 4-color 2×2 patterns. Since most spectral richness lies in the C, M and Y colorants, the 864 (see Table 2) truly 3-color CMY color patterns are employed, requiring a total of 864+468=1332 color patches to print and synthesize reflectance for each of the 16,576 4-color 2×2 patterns. However, owing to the clustering algorithm or module 18 (FIG. 1), far fewer than 1332 patches are required because only a subset of the 16576 patches need to be characterized. Results for three sets of patches are described with regard to examples and figures that follow.

Figure 4:
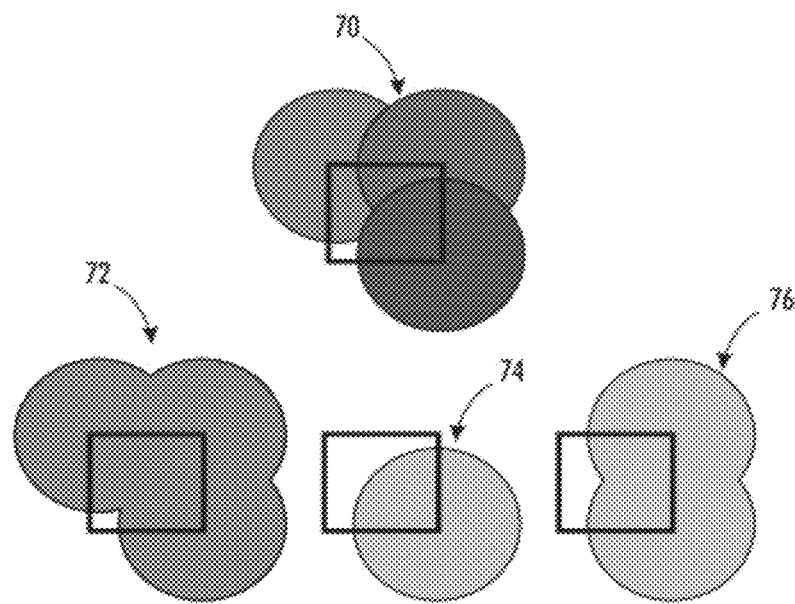
FIG. 4 illustrates a 3-color 2×2 overlap as an overlap of respective single colorants.
Figure 5:
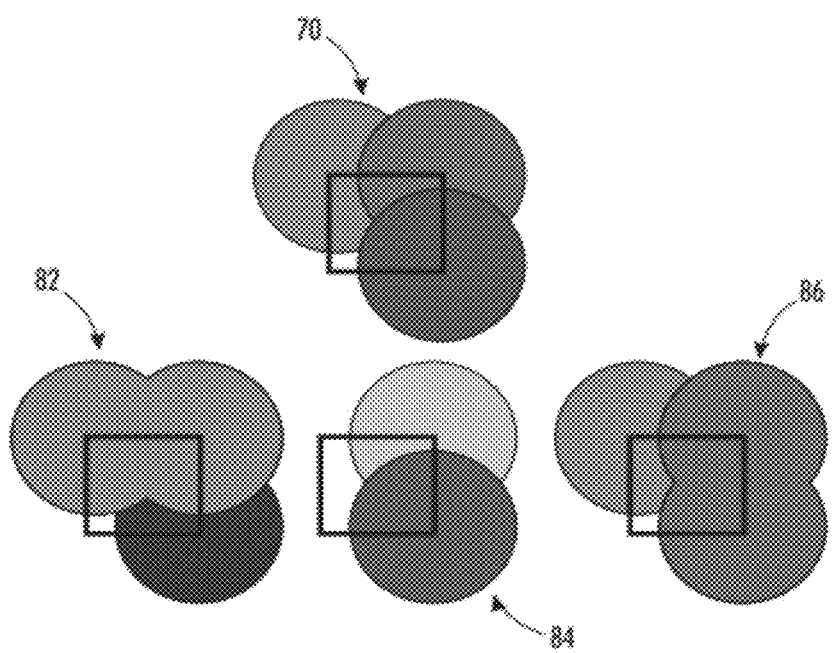
FIG. 5 illustrates the 3-color 2×2 overlap as an overlap of respective two-color 2×2 binary patterns.

FIGS. 4 and 5 show for example a 3-color 2×2 CMY binary basis pattern being decomposed in two distinct ways. FIG. 4 illustrates a 3-color 2×2 overlap 70 as an overlap of respective single colorants 72, 74, 76. FIG. 5 illustrates the 3-color 2×2 overlap 70 as an overlap of respective two-color 2×2 binary patterns 82, 84, 86. A patch reduction is then possible based on the assumption that the reflectance for a multi-colorant binary pattern can be approximated suitably as a function of the reflectance of the decomposed binary patterns with relatively fewer colorants.

It will be appreciated that although the described systems and methods relate to 2×2 printer models, various features such as clustering to eliminate redundancies, reflectance synthesis for colorant overlaps (Equation 4) in general are applicable to any suitable binary printer model. Moreover, the described techniques can be used for patch reduction in printers with more than 4 colorants; since spectral redundancy is higher in those cases, the benefits of the proposed measurement reduction techniques are more pronounced.

Figure 6:
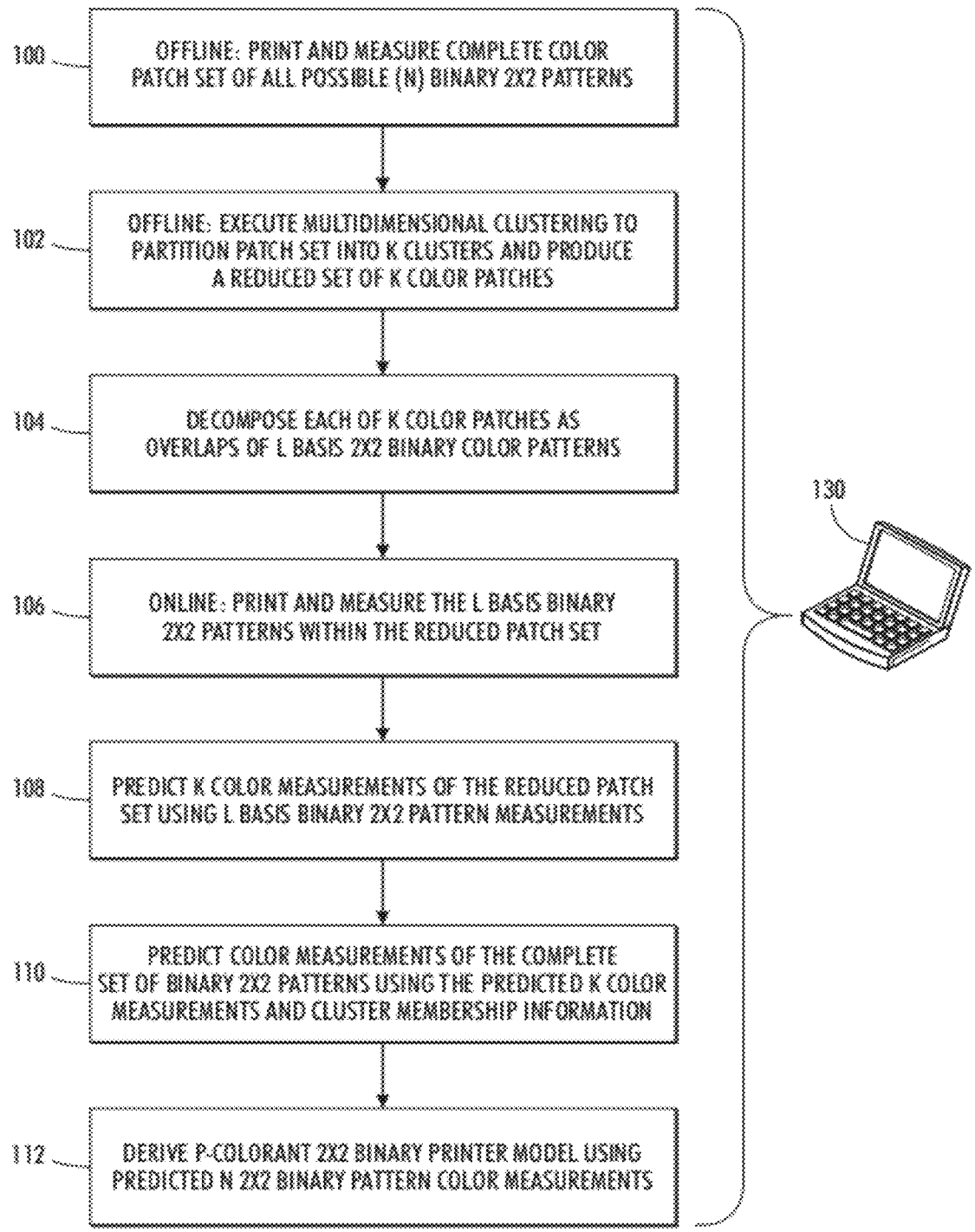

FIG. 6 illustrates a flow diagram of a method for performing color characterization in a printer for printer calibration or the like. At 100, a complete color patch set of all possible (N, where N is an integer) binary 2×2 patterns is printed and measured offline. For instance, in a 4-color systems (e.g., CMYK, RGBW, etc.), a complete set of 16576 color patches are printed and measured. At 102, in an initial step, a multi-dimensional clustering technique is performed to partition each patch set into K clusters and produce a reduced set of K color patches (where K is an integer less than N). In one example, k-center clustering is performed on the 2×2 color model to reduce the number of patches. At 104, each of the K color patches is decomposed as an overlap of L basis 2×2 binary color patterns (where L is an integer less than K). Decomposing the reduced color set (K) data set includes predicting a color of binary patterns in the reduced set using a multiplicative reflectance model. At 106, at run time, each of the L basis binary 2×2 patterns within the reduced patch set is printed and measured. At 108, color measurements in the reduced patch set are predicted using L basis binary 2×2 pattern measurements. At 110, N color measurements are predicted for the complete set of binary 2×2 color patterns using the predicted K color measurements and cluster membership information. At 112, a P-colorant 2×2 binary printer model is derived using N predicted 2×2 binary printer color measurements.

According to an example, 4 different characterizations are evaluated for a CMYK color printer (e.g., a Xerox DC8000 or the like) against a benchmark approach (e.g., a conventional approach) that utilizes all 16576 patches and obtains color predictions as by the printer model described by Wang. As shown in Table 3, the first example includes the patch reduction approach as in S. Wang et al. ("Two-by-two centering printer model", *Proc. Fourth Int. Conf. on Imaging Science and Hardcopy (ISISH '01)*, 2001, 1-4) using 468 patches, and the following three examples are different embodiments of the systems and methods described herein, employing 424, 658 and 1332 patches, respectively.

In these examples, 1332 patches is the upper bound of patches needed if no clustering is used. When a k-center clustering with a cluster radius of 1 ΔE is employed, 424 patches are employed if only 2-colorant 2×2 basis patterns are used, and 658 patches are employed if both 2- and 3-colorant 2×2 basis patterns are used to decompose a reduced set of 4-colorant 2×2 patterns.

TABLE 3

| Error against the (full patches) CMYK binary printer model | Average ΔE | 95% ΔE | Maximum ΔE |
| --- | --- | --- | --- |
| Previous approach (468 patches) | 4.72 | 6.12 | 7.95 |
| Described approach - 424 patches | 2.87 | 5.32 | 6.00 |
| Described approach - 658 patches | 2.13 | 4.31 | 6.00 |
| Described approach - 1332 patches | 1.92 | 3.55 | 4.01 |

The described systems and methods may be performed by or included in a computer program product that may be executed on a computer 130 or computing device, which may be separate from or integral to the printer 36 of FIG. 1. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 12 of FIG. 1, a system memory such as the memory 14 of FIG. 1, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of halftone-independent characterization of color printers, comprising:
    initially printing and measuring a complete color patch set comprising all possible (N) binary 2×2 patterns printable by a P-colorant printer, where N, P are both integers, in order to produce an initial set of measurements in a perceptual color space;
    performing a multidimensional clustering that partitions the complete patch set into K clusters, where K is an integer less than N, and produces a reduced set of K color patches, wherein each patch is a representative member of a cluster;
    decomposing each of the said K color patches as overlaps of L basis binary 2×2 patterns where L is less than K, and wherein each of the basis binary 2×2 patterns contain fewer colorants than the color binary patterns in the complete patch set;
    at run-time, printing and measuring the said L binary 2×2 color patterns within the reduced patch set;
    predicting K color measurements in the reduced patch set using the color measurements of the said L basis binary 2×2 color patterns to predict and a multiplicative reflectance model;
    predicting the color measurements of the complete set of N binary 2×2 patterns using said predicted K color measurements of the reduced patch set and cluster membership information; and
    deriving a P-colorant 2×2 binary printer model using said predicted measurements.

2. The method of claim 1, wherein the multiplicative reflectance model is defined by the equation:

$$R(\lambda) = \prod_{i=1}^{L} (R_i(\lambda))^{a_i}$$

where L is the number of basis binary patterns, where $R_i(\lambda)$ is the reflectance of the i-th basis binary patterns, where $a_i$ is an estimated contribution of each basis binary pattern, and where $R(\lambda)$ is the reflectance of a color in the reduced patch set.

3. The method of claim 1, wherein the perceptual color space is CIELAB color space.

4. The method of claim 1 wherein the multidimensional clustering technique is k-center clustering.

5. The method of claim 1, wherein P=4.

6. The method of claim 1, wherein the colorants in the basis color binary patterns include one of:
    cyan, magenta, yellow, and key (CMYK) colorants; and
    red, green, blue, white (RGBW) colorants.

7. The method of claim 1, further including characterizing the printer for a given halftone using the P-colorant 2×2 binary printer model.

8. A system that facilitates halftone-independent characterization of color printers, comprising:
    a printer that initially prints and measures a complete color patch set comprising a complete set of N possible binary 2×2 patterns printable by a P-colorant printer, where N, P are integers, in order to produce an initial set of measurements in a perceptual color space;
    a processor that executes computer-executable instructions stored to a memory, including instructions for:
        performing a multidimensional clustering that partitions the complete patch set into K clusters, where K is an integer smaller than N and produces a reduces set of K color patches, wherein each patch is a representative member of a cluster;
        at run time, printing and measuring the L basis 2×2 binary color patterns within the reduced patch set, where L is an integer less than K;
        predicting K color measurements in the reduced patch set using the color measurements of the L basis binary 2×2 color patterns and a multiplicative reflectance model;
        predicting N color measurements of the complete set of N binary 2×2 patterns using the predicted K color measurements of the reduced patch set and cluster membership information; and
        deriving a P-colorant 2×2 binary printer model from the N predicted color measurements.

9. The system of claim 8, wherein the multiplicative reflectance model is defined by the equation:

$$R(\lambda) = \prod_{i=1}^{L} (R_i(\lambda))^{a_i}$$

where L is a number of basis binary patterns, where $R_i(\lambda)$ is the reflectance of the $i^{th}$ basis binary pattern, where $a_i$ is an estimated contribution of each basis binary pattern, and where $R(\lambda)$ is the reflectance of a color in the reduced patch set.

10. The system of claim 8, wherein the perceptual color space is CIELAB color space.

11. The system of claim 8, wherein the multidimensional clustering technique is a k-clustering technique.

12. The system of claim 8, wherein N=4.

13. The system of claim 8, wherein the colorants in the basis color binary patterns include one of:
   cyan, magenta, yellow, and key (CMYK) colorants; and
   red, green, blue, white (RGBW) colorants.

14. The system of claim 8, the instructions further including characterizing the printer for a given halftone using the P-colorant 2×2 binary printer model.

15. An apparatus for performing halftone-independent characterization of color printers, comprising:
   means for initially printing and measuring a complete color patch set comprising all possible (N) binary 2×2 patterns printable by a P-colorant printer, where N, P are both integers, in order to produce an initial set of measurements in a perceptual color space;
   means for performing a multidimensional clustering that partitions the complete patch set into K clusters, where K is an integer significantly smaller than N, and produces a reduced set of K color patches, wherein each patch is a representative member of a cluster;
   means for decomposing each of the said K color patches as overlaps of L basis binary 2×2 patterns where L is less than K, and wherein each of the basis binary 2×2 patterns contain fewer colorants than the color binary patterns in the complete patch set;
   means for printing and measuring, at run time, the said L binary 2×2 color patterns within the reduced patch set;
   means for predicting the K color measurements in the reduced patch set using the color measurements of the said L basis binary 2×2 color patterns to predict and a multiplicative reflectance model;
   means for predicting the color measurements of the complete set of N binary 2×2 patterns using said predicted K color measurements of the reduced patch set and cluster membership information; and
   means for deriving a P-colorant 2×2 binary printer model using said predicted measurements.

16. The apparatus of claim 15, wherein the multiplicative reflectance model is defined by the equation:

$$R(\lambda) = \prod_{i=1}^{L} (R_i(\lambda))^{a_i}$$

where L is a number of basis binary patterns, where $R_i(\lambda)$ is the reflectance of the $i^{th}$ basis binary pattern, where $a_i$ is an estimated contribution of each basis binary pattern, and where $R(\lambda)$ is the reflectance of a color in the reduced patch set.

17. The apparatus of claim 15, wherein the perceptual color space is CIELAB color space.

18. The apparatus of claim 15, wherein the multidimensional clustering technique is a k-clustering technique.

19. The apparatus of claim 15, wherein the colorants in the basis color binary patterns include one of:
   cyan, magenta, yellow, and key (CMYK) colorants; and
   red, green, blue, white (RGBW) colorants.

20. The apparatus of claim 15, the instructions further including characterizing the printer for a given halftone using the P-colorant 2×2 binary printer model.

* * * * *